(12) United States Patent
Alvarez et al.

(10) Patent No.: US 7,979,632 B2
(45) Date of Patent: Jul. 12, 2011

(54) STORAGE SYSTEM INCLUDING A FAST STORAGE DEVICE FOR STORING REDUNDANT DATA

(75) Inventors: Guillermo Alvarez, San Jose, CA (US); Mustafa Uysal, Davis, CA (US); Arif Merchant, Los Altos, CA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1388 days.

(21) Appl. No.: 10/235,924

(22) Filed: Sep. 6, 2002

(65) Prior Publication Data

US 2004/0049643 A1 Mar. 11, 2004

(51) Int. Cl.
*G06F 12/00* (2006.01)

(52) U.S. Cl. ........... 711/114; 711/4; 711/5; 711/100; 711/113; 711/161; 711/162; 714/6.2; 714/6.21; 714/6.22; 714/6.23

(58) Field of Classification Search .......... 711/100, 711/111–114, 4–7, 161–162; 714/5–6, 6.21, 714/6.22, 6.23, 6.2, 6.7, 11; 707/204; 719/325
See application file for complete search history.

(56) References Cited

U.S. PATENT DOCUMENTS

| | | | | |
|---|---|---|---|---|
| 5,177,744 A * | 1/1993 | Cesare et al. | ............... | 714/6 |
| 5,394,532 A * | 2/1995 | Belsan | .................. | 711/114 |
| 5,548,711 A * | 8/1996 | Brant et al. | ............... | 714/5 |
| 5,659,704 A * | 8/1997 | Burkes et al. | ............... | 711/114 |
| 5,701,406 A * | 12/1997 | Matsumoto et al. | ............... | 714/6 |
| 5,787,460 A * | 7/1998 | Yashiro et al. | ............... | 711/114 |
| 6,397,292 B1 * | 5/2002 | Venkatesh et al. | ............... | 711/114 |
| 6,772,302 B1 * | 8/2004 | Thompson | ............... | 711/162 |
| 6,922,752 B2 * | 7/2005 | Uysal et al. | ............... | 711/114 |
| 2001/0018728 A1 * | 8/2001 | Topham et al. | ............... | 711/113 |
| 2001/0049776 A1 * | 12/2001 | Maeda | ............... | 711/162 |
| 2002/0174296 A1 * | 11/2002 | Ulrich et al. | ............... | 711/114 |
| 2003/0018851 A1 * | 1/2003 | Ikeuchi et al. | ............... | 711/114 |

OTHER PUBLICATIONS

Hu, Yiming and Yang, Qing; "DCD—Disk Caching Disk: A New Approach for Boosting I/O Performance;" Dept. of Electrical & Computer Engineering, University of Rhode Island, Kingston, RI 02881, May 1996, pp. 169-178.

Menon, Jai and Mattson, Dick; "Distributed Sparing in Disk Arrays;" IBM Almaden Research Center, San Jose, California 95120-6099, 1992, pp. 410-421.

Merchant, Arif and Yu, Phillip S.; "Analytic Modeling and Comparisons of Striping Strategies for Replicated Disk Arrays;" IEEE Transactions on Computers, vol. 44, No. 3, Mar. 1995, pp. 419-433.

Chiueh, Tzi-cker and Huang, Lan; "Trail: A Fast Synchronous Write Disk Subsystem Using Track-Based Logging;" Computer Science Department, State University of New York at Stony Brook; Stony Brook, NY 11794-4400, pp. 1-22.

Hu, Yiming; Yang, Qing and Nightingale, Tycho; "Rapid-Cache—A Reliable and Inexpensive Write Cache for Disk I/O Systems;" Department of Electrical & Computer Engineering, University of Rhode Island, Kingston, RI 02881, Jan. 1999, pp. 1-10.

(Continued)

*Primary Examiner* — Sanjiv Shah
*Assistant Examiner* — Zhuo H Li

(57) ABSTRACT

A computer storage system includes a controller, a first storage device and a second storage device including at least one fast storage device. The controller is configured to perform data operations. The first storage device stores data, and the second storage device stores data redundant to the data stored in the first storage device.

18 Claims, 6 Drawing Sheets

OTHER PUBLICATIONS

Solworth, Jon A. and Orji, Cyril U.; "Distorted Mirrors;" University of Illinois at Chicago, Box 4348, Chicago, Illinois 60680, Apr. 1991, pp. 10-17.

L. Richard Carley, Gregory R. Ganger and David F. Nagle, MEMS-Based Integrated-Circuit Mass-Storage Systems, Communications of the ACM, vol. 43, No. 11., Nov. 2000.

* cited by examiner

STORAGE SYSTEM INCLUDING A FAST STORAGE DEVICE FOR STORING REDUNDANT DATA

FIELD OF THE INVENTION

The invention pertains to computer storage systems. More particularly, this invention relates to a computer storage system utilizing fast storage devices.

BACKGROUND OF THE INVENTION

Disk arrays are used to provide storage for computer applications that need reliability in the face of component failures, and high performance in normal use. The disks in the disk arrays are often arranged as redundant array of independent disks (RAID) to increase reliability. The array provides larger capacity, higher performance and, typically, higher availability for stored data than using disks individually. This is done by distributing the data across multiple disks and storing either a redundant copy of the data or enough parity information to regenerate the data if a disk or related component fails.

The existence of multiple replicas of the same data affects performance and reliability. For example, the most convenient/idlest/closest copy of data may be accessed for a read operation, but all copies will eventually have to be updated after a write. The two most widely used schemes for mapping client data onto a disk array are RAID 1/0 and RAID 5. Both rely on disk striping, where data is simultaneously read from or written to multiple disks. Disk striping utilizes stripe units (i.e., a fixed-size block) to store data in a single disk. A stripe unit may include a data unit or a parity unit depending on the RAID layout being used. A collection of related stripe units are called a stripe.

RAID 1/0 consists of striped mirroring, in which two copies of every data unit are kept on two or more disks, and RAID 5 keeps one parity unit per fixed number of data units (a set of data units and their corresponding parity units are a stripe), and parity units rotated among all disks. In RAID 1/0, a stripe is the set of stripe units that start at the same offset in all disks in a logical unit (LU), such as a mirrored pair. In RAID 5, a stripe is again the set of units that start at the same offset in each disk in an LU, but there are n−1 data units and a single parity unit for n disks. The composition of an LU in a RAID layout may vary depending on the RAID layout being used. Generally, an LU includes all the disks acting as a single virtual storage device.

RAID 1 and RAID 4 are also widely used. RAID 1 (like RAID 1/0) uses mirroring for storing redundant data, but does not use striping. RAID 4 (like RAID 5) uses parity information for storing redundant data, the difference being that a single disk contains all parity stripe units. In RAID 4, a stripe is again the set of units that start at the same offset in each disk in an LU.

In a standard RAID 1/0 implementation, two equal copies of the data are stored in each pair of disks (i.e., mirrored pair). Every time a read operation is performed, the array controller issues a read access to whichever of the two devices in the mirrored pair is likely to service the request sooner.

A disadvantage of RAID 1 and RAID 1/0 is that, in order to complete a write while tolerating the failure of any single disk, data is to be written to both a disk and to another disk (i.e., the mirror disk) storing the redundant data. Therefore, it is necessary to wait for both copies of data to be updated. Even though writes to the two corresponding disks are typically initiated in parallel by an array controller, the writes are rarely completed simultaneously. Each disk is processing accesses corresponding to other client requests in parallel, and moreover, being mechanical devices, the response time of a disk for a particular access depends on which access was serviced last (i.e., the positions of the mechanical components affect response times). Because of this, the average time spent waiting for two parallel disk accesses to complete is typically greater than the average time for a single disk access.

RAID 4 and RAID 5 suffer from more acute versions of the same problems. Both the stripe units being written and the corresponding parity units must be updated before the write can be considered complete. For example, if less than half of the units in a given stripe are being written (i.e., a "small write"), then the following is performed: the parity unit is read; its contents exclusive-OR'ed with the new values being written and with the old values they replace (which must therefore also be read); and the corresponding new values of the data and parity units are written back to disk. Therefore, the redundant data (i.e., the parity unit) is not only written, but also read to complete the operation.

SUMMARY OF THE INVENTION

According to an embodiment of the invention, a storage system includes a controller configured to perform data operations, a first storage device, and a second storage device including at least one fast storage device. The first storage device stores data, and the second storage device stores data redundant to the data stored in the first storage device.

According to another embodiment of the invention, a method for performing data operations on a storage system, where the storage system includes at least one first storage device and at least one fast storage device, includes steps of receiving a request to perform a data operation; determining whether the request provokes a write operation on the storage device; and writing data to the at least one first storage device and writing redundant data to the at least one fast storage device in response to the request provoking a write operation.

According to yet another embodiment of the invention, a computer storage apparatus comprises means for receiving a request to perform a data operation; means for determining whether the request provokes a write operation on the storage device; and means for writing data to the at least one first storage device and writing redundant data to the at least one fast storage device in response to the request provoking a write operation.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
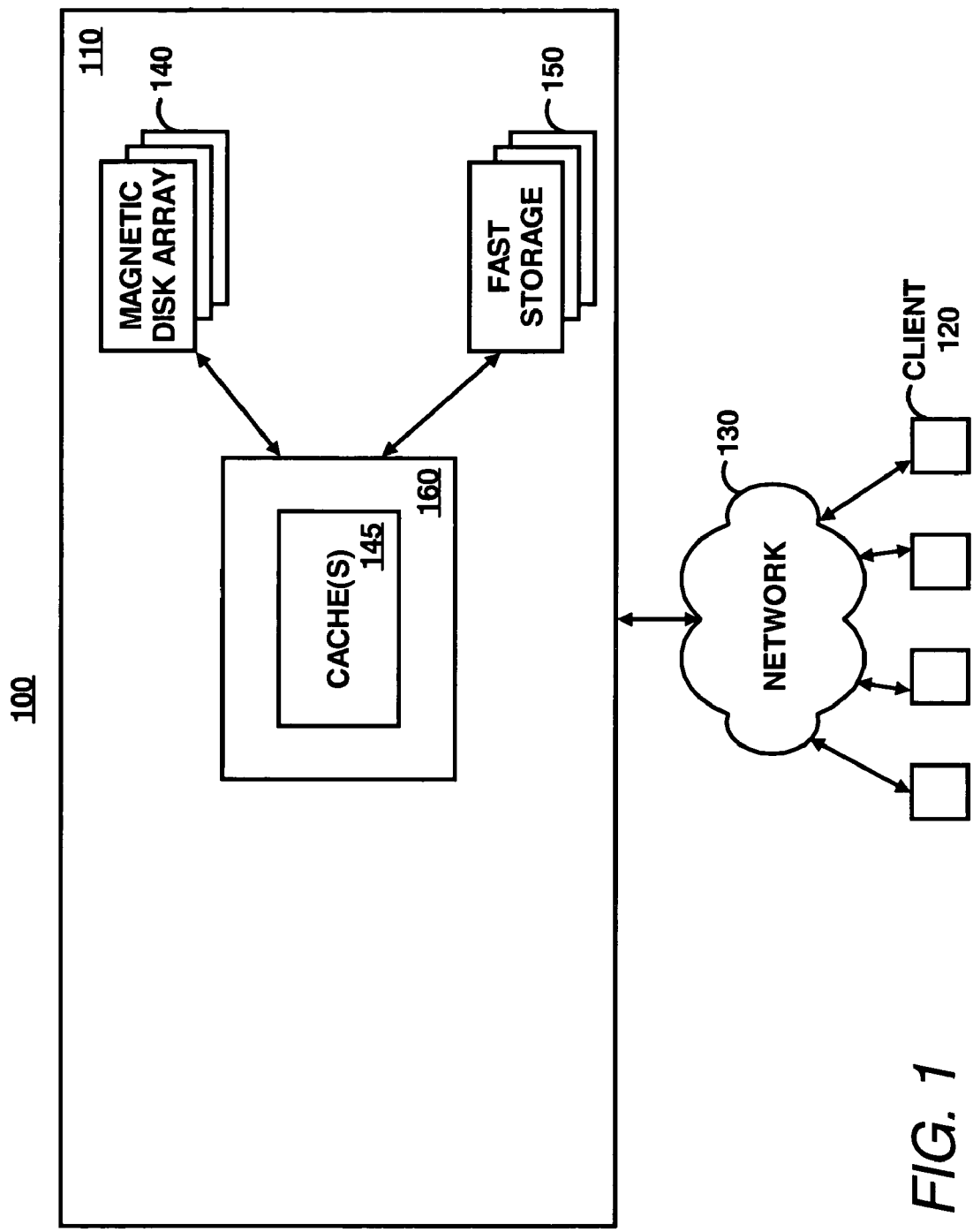
FIG. 1 illustrates a computer system, according to an embodiment of the invention.

FIG. 1 illustrates a computer system 100, according to an embodiment of the invention. The computer system 100 includes a storage device 110 connected to at least one client 120 (e.g., a server) via a network 130. The storage device 110 includes multiple magnetic disks 140 and multiple fast storage devices 150 connected to a controller 160, which manages data operations for the disks 140 and the fast storage devices 150.

The storage device 110 may optionally include one or more caches for caching data for the disks 140 and the fast storage devices 150. FIG. 1 illustrates a cache 145 connected to the disks 140, the fast storage devices 150, and the controller 160. In one embodiment, the cache 145 is combined with the controller 160. The cache 145 may be external to the controller 160 also. One or more caches 145 may be used in the storage device 110.

The fast storage devices 150 may include one or more of several kinds of storage devices that have a smaller overhead than magnetic disks before starting data transfers. These devices may have data transfer rates similar to or better than magnetic disks, but much shorter positioning times. One such storage device is a micro-electro-mechanical (MEMS) storage device. The storage system 100 may include one or more fast storage devices 150 for storing data. In addition, the fast storage devices 150 are not limited to MEMS and may include other fast storage devices, such as flash RAM, magneto-resistive RAM (MRAM), battery-backed DRAM or SRAM, etc.

In one embodiment, the disks 140 are configured as a RAID and are used in combination with the fast storage devices 150. The disks 140 may store one copy of the data and the fast storage devices 140 may store redundant data (e.g., mirror data for RAID 1 or RAID 1/0, or parity information for RAID 4 or RAID 5). In one example, the storage device 110 may include at least two arrays, where one array includes the disks 140 and the other array includes the fast storage devices 150. U.S. patent application Ser. No. 10/226,111, entitled, "Computer Storage System with Fast Storage Devices" and herein incorporated by reference, discloses such an example.

Since access times are shorter for the fast storage devices 150, write operations are performed much more efficiently for all RAID levels (e.g., access times can be equivalent to those for a single disk access, for it subsumes the much faster write access to the fast device). Therefore, overall performance for the storage device 110 is improved. Furthermore, a balance between performance and hardware cost may be achieved by combining the fast storage devices 150 with slower, less expensive storage devices (e.g., the disks 140) within the same logical unit (LU).

Because of the fundamental differences between different RAID levels (e.g., 1, 1/0, 4, 5, etc.), the fast storage devices 150 and the disks 140 may be utilized in different combinations. As an example, for a RAID 1 and RAID 1/0 implementation, half of the disks in a conventional mirrored pair are replaced with fast storage devices of at least the same capacity. Each mirrored pair contains two equal copies of data, such as one copy on at least one disk (e.g., at least one of the disks 140) and the other copy on at least one fast storage device (e.g., at least one of the fast storage devices 150). When disk striping is performed, such as for a RAID 1/0 implementation, one copy of the data may be stored across multiple disks 140 and the other copy of the data may be stored across multiple fast storage devices 150. In this case, a mirrored pair may include at least two of the disks 140 and at least two of the fast storage devices 150. Additionally, since the disks 140 and the fast storage devices 150 may be of differing capacities, the effect of a single fast storage device 150 may be achieved by performing striping or other aggregation techniques (such as simple concatenation, in the style of logical volume managers) across multiple fast storage devices. In all the embodiments described herein, this extension should be considered a possible variant of those embodiments.

Figure 2:
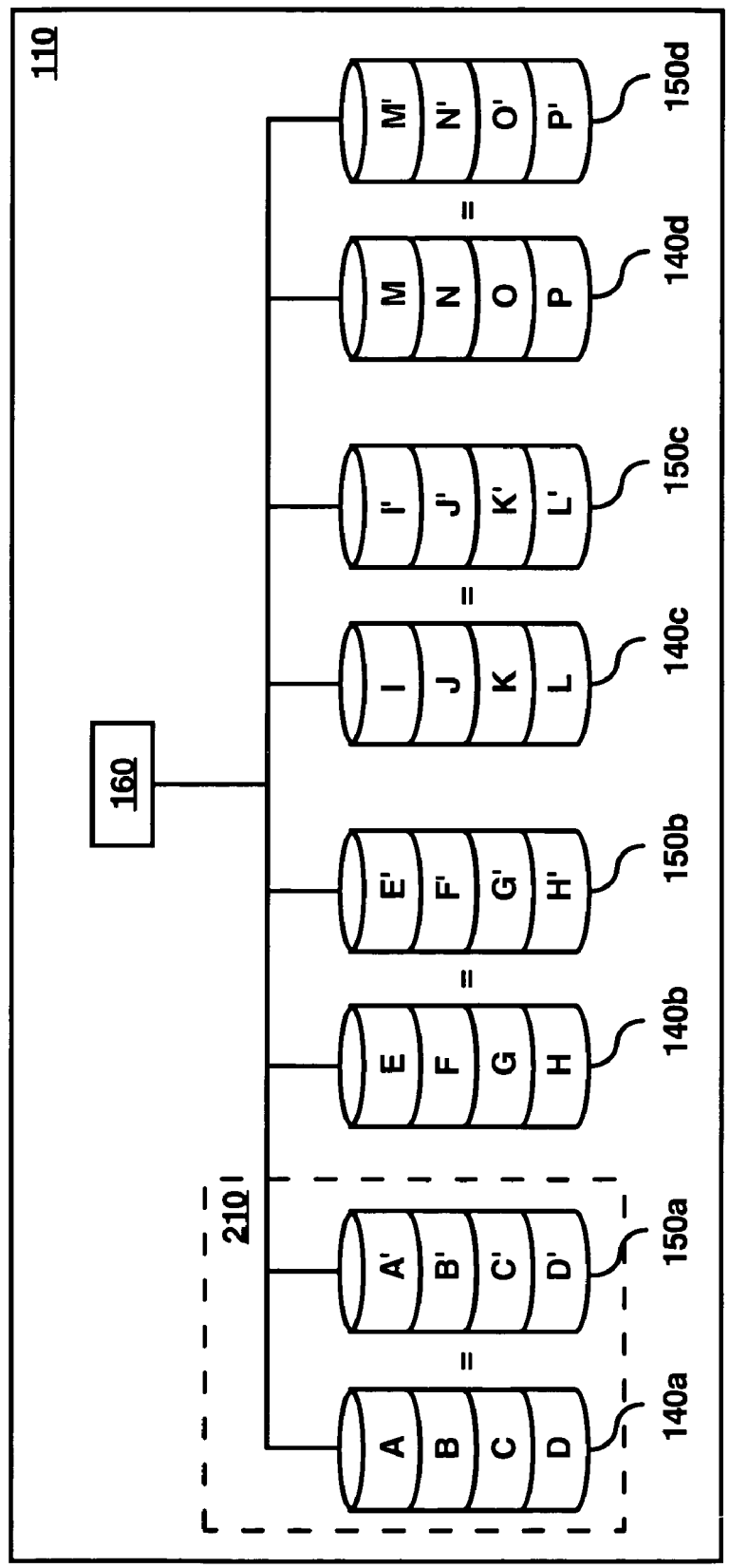
FIG. 2 illustrates an embodiment of the storage device shown in FIG. 1.

FIG. 2 illustrates an embodiment of the storage device 110 configured for mirrored pairs, such as used in a RAID 1 layout. The disks 140 $a \ldots d$ of the disks 140 shown in FIG. 1 store data blocks A-P, with the address space of the LU laid out across these blocks in order: A, B, C, . . . P. Each of the fast storage devices 150 $a \ldots d$ of the fast storage devices 150 shown in FIG. 1 form mirrored pairs with the disks 140 $a \ldots d$ respectively. Fast storage devices 150 $a \ldots d$ store copies (i.e., A'-P') of data blocks A-P. One mirrored pair forms an LU, such as LU 210 including the mirrored pair of the disk 140$a$ and the fast storage device 150$a$. Each of the mirrored pairs shown in FIG. 2 may act as an LU.

Figure 3:
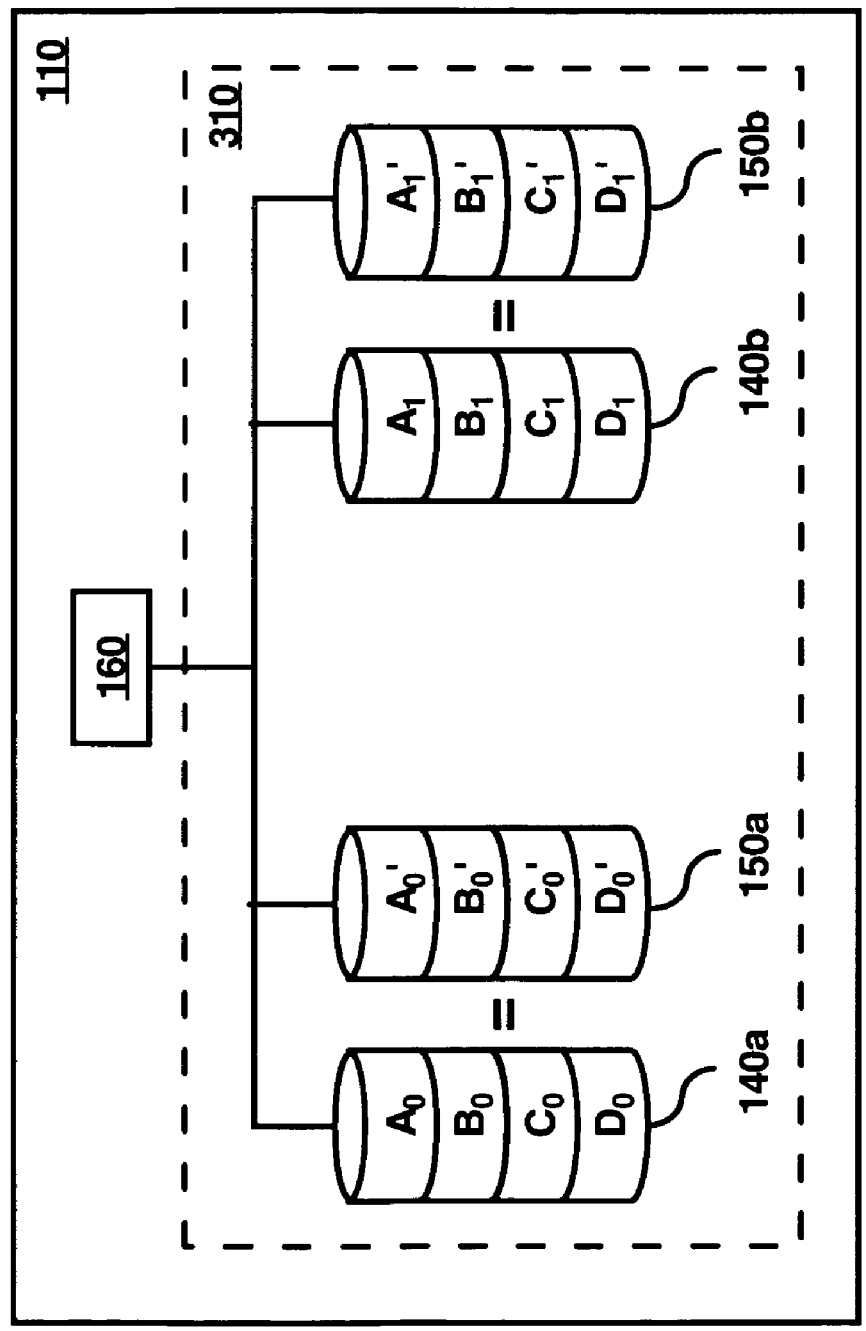
FIG. 3 illustrates another embodiment of the storage device shown in FIG. 1.

FIG. 3 illustrates another embodiment of the storage device 110 configured for striped mirrored pairs, such as used in a RAID 1/0 layout. An LU 310 includes at least two mirrored pairs. Disks 140$a$ and 140$b$ form half of a mirrored pair and store stripe units (e.g., $A_0$-$D_0$ and $A_1$-$D_1$), and fast storage devices 150$a$ and 150$b$ for the remaining half of the mirrored pairs store copies of the stripe units (e.g., $A_0'$-$D_0'$ and $A_1'$-$D_1'$). The address space of the LU is laid out across these blocks in the order $A_0$, $A_1$, $B_o$, $B_1$, . . . $D_o$, $D_1$, together with their counterparts on the fast storage devices 150$a$ and 150$b$. More than one LU may be provided in the storage device 110.

The embodiments shown in FIGS. 2 and 3 are provided for illustration purposes and not by way of limitation. It will be apparent to one of ordinary skill in the art that the number and configuration of disks and fast storage devices used in the storage device 110 can vary and be optimized for different applications.

Referring back to FIG. 1, when performing a read operation in a mirrored-pair implementation, the controller 160 may typically select a copy of the data from the fast storage devices 150 for retrieval. However, as loads get heavier, a copy of the data on the disks 140 may be selected at times, to share the burden of servicing an increasingly larger fraction of the read workload. For example, read scheduling may be done by factoring into the decision not only the amount of pre-existing load on each device, but also the proximity (as in positioning delays) between previous accesses and the new read access.

For write operations in a mirrored-pair implementation, the controller 160 writes one copy of the data to the disks 140 and another copy of the data (i.e., a copy for storage on media comprising a mirrored pair) to the fast storage devices 150. A write operation is not complete until both copies are stored. Under light loads, the write issued to the fast storage devices 150 typically finishes before the write issued to the disks 140. Therefore, service times are generally the same as only storing the data on a single disk without the costs (e.g., access time, request throughput) associated with providing protection by maintaining a separate copy of the data stored on another storage device. Under heavy loads, latencies may be higher for both devices (e.g., the disks 140 and the fast storage devices 150), possibly due to queuing of pending requests. However, the average completion delay for a write operation may still be much shorter than for a system containing no fast storage devices. If a device (e.g., one of the disks 140 or one of the fast storage devices 150) fails, the surviving one in the mirrored pair handles all the load until a second copy of the data is restored.

In a RAID 4 layout, an LU includes a plurality of storage units, and one of the storage units may be devoted to storing parity (exclusive-or) information for all the data units in each stripe.

Figure 4:
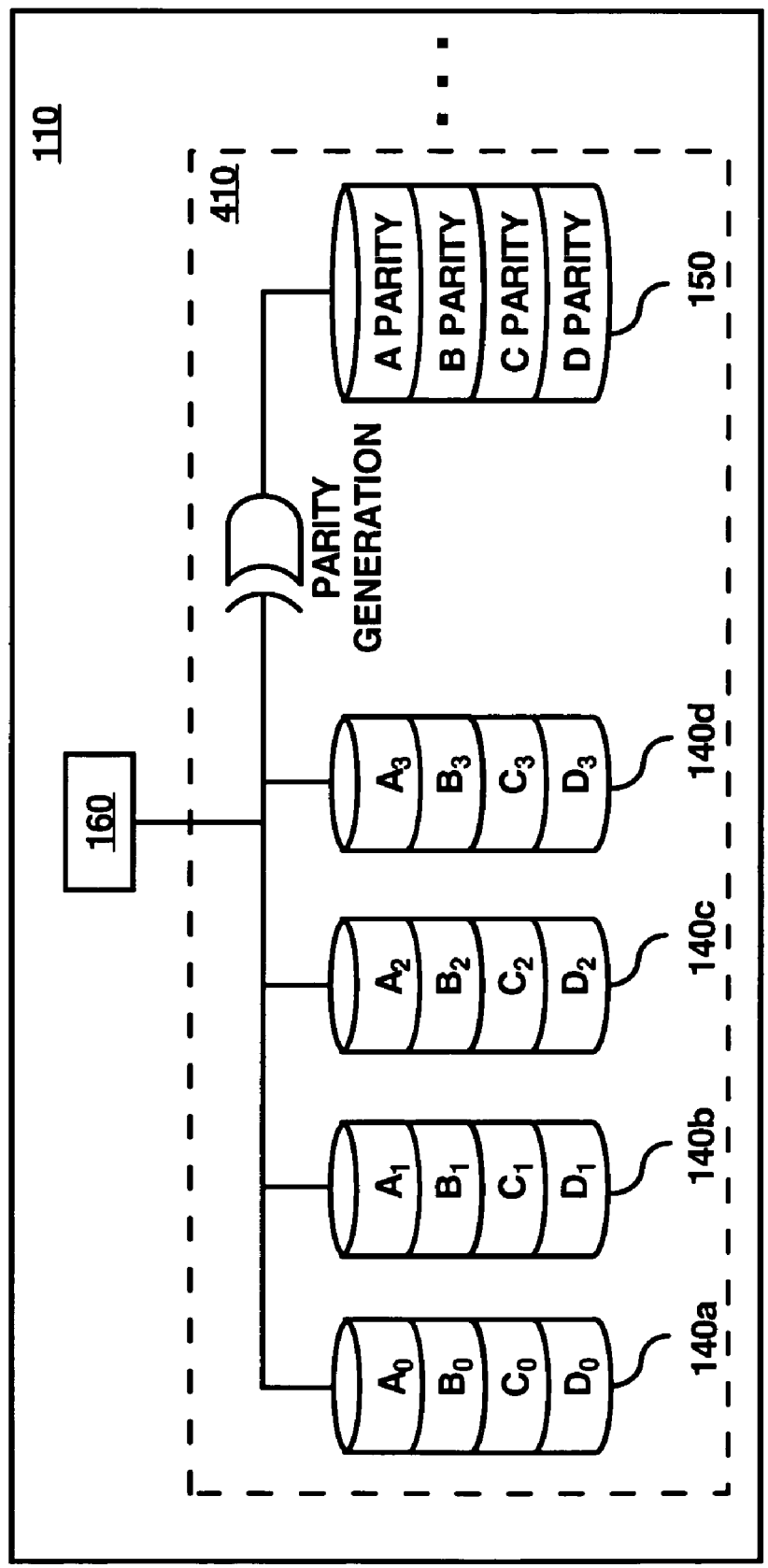
FIG. 4 illustrates yet another embodiment of the storage device shown in FIG. 1.

FIG. 4 illustrates an embodiment of the storage device 110 using a fast storage device 150 to store parity information, such as used in a RAID 4 layout. Disks 140 a . . . d of the disks 140 shown in FIG. 1 store stripes A . . . D. For example, stripe units $A_o$ . . . $A_3$ are stored in the disks 140 a . . . d. Parity information is stored in the fast storage device 150. The disks 140 a . . . d and the fast storage device 150 form an LU 410 for storing stripes A-D. It will be apparent to one of ordinary skill in the art that the number and configuration of disks and fast storage devices used in the storage device 110 can vary and be optimized for different applications. Furthermore, one or more fast storage devices may be used to store the parity information. Also, more than one LU may be used in the storage device 110.

In a RAID 5 layout, an LU includes a plurality of stripes, each stripe including a plurality of stripe units, as in a RAID 4 layout. Each stripe may include a parity stripe unit devoted to storing the parity (exclusive-or) of the data in the other stripe units in that stripe. Unlike a RAID 4 layout, the parity stripe units in a RAID 5 layout are distributed over a plurality of disks.

Figure 5:
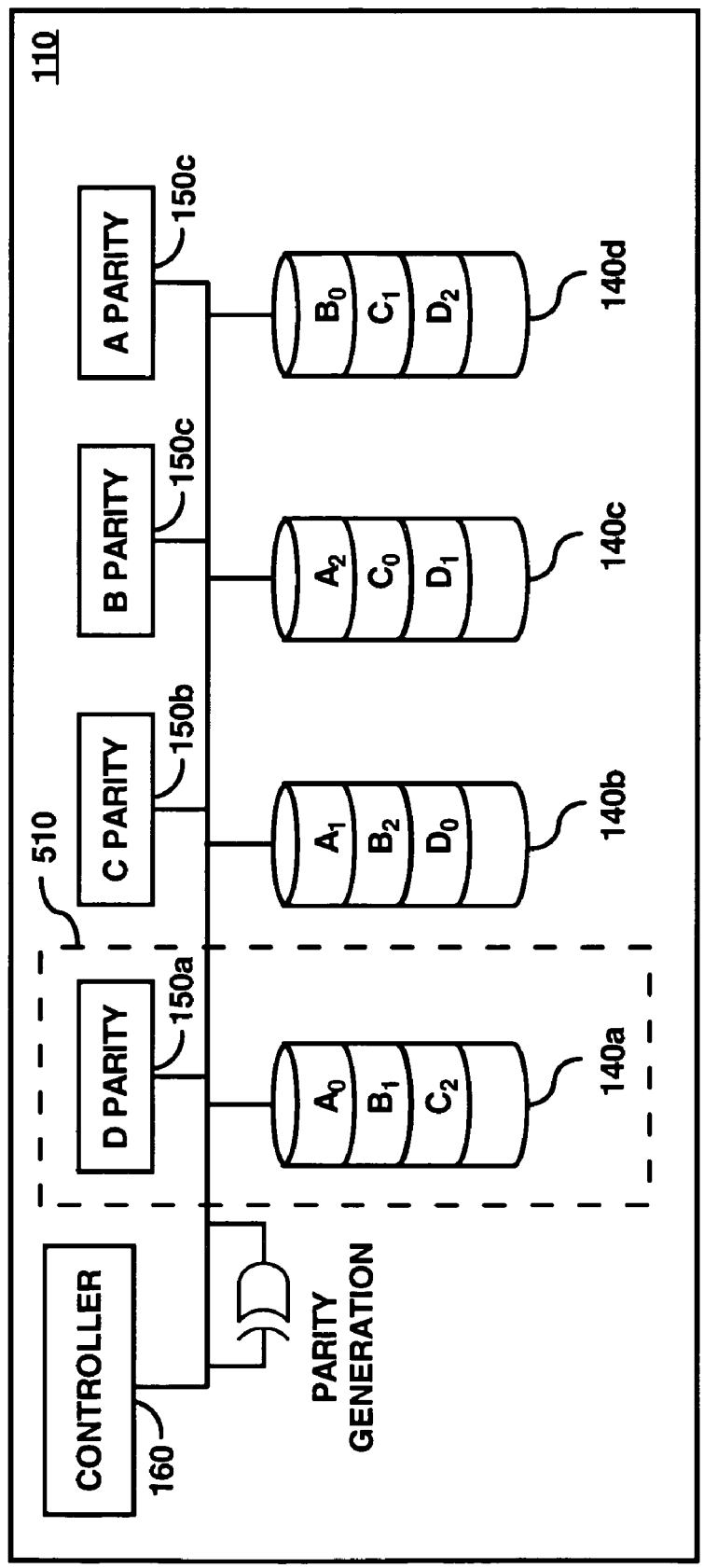
FIG. 5 illustrates yet another embodiment of the storage device shown in FIG. 1.

FIG. 5 illustrates an embodiment of the storage device 110 using a fast storage device 150 to store parity information in a RAID 5 layout. Disks 140 a . . . d of the disks 140 shown in FIG. 1 store stripes A . . . D. For example, stripe units $A_o$ . . . $A_3$ are stored in the disks 140 a . . . c. Instead of using a dedicated parity storage device, the parity information is spread among multiple storage devices. For example, parity information for stripe A is stored in the fast storage device 150d, and parity information for the stripe B is stored in the fast storage device 150c. For RAID 5, a fast storage device 150 can be paired with each disk 140 (such as shown with dashed lines and labeled 510); the fast storage device 150 may have a smaller capacity than a corresponding disk 140.

For a RAID 4 or a RAID 5 implementation, one or more of the fast storage devices 150 store the parity information for each LU. The fast storage devices 150 store all the parity information for the LU, and the disks 140 store all the data for each stripe. When a stripe unit is read, the controller 160 issues a read access to the disk of the disks 140 that contains the unit, unless that disk has failed. In that case, the missing unit is reconstructed on the fly from the remaining data units and the parity information stored in the fast storage devices 150.

When a stripe is written, the parity units are stored on the fast storage devices 150 and the data units are stored on the disks 140. Using the fast storage devices 150 minimizes the impact of bottlenecks that may result from accessing parity units stored on a slow device.

In general, a write operation is considered complete when the parity and the data are written to the fast storage devices 150 and the disks 140. However, as described above, by using the caches 145 and fast storage devices 150, a write may be considered complete when the data is cached rather than when the data is written to the disks 140 and the fast storage devices 150. In order to prevent data loss, persistent caches may be used for the caches 145 such that a write operation may be considered complete when data and parity units are cached. Therefore, when using this caching technique, it may not be necessary to wait for the data to be written to the disks 140 for a write operation to be completed. However, this makes the system vulnerable to data loss if the cache 145 fails. Data resiliency can be increased with the use of fast storage devices 150 in two ways. Firstly, the length of time that the data sits only in cache 145 can be reduced, thanks to the higher performance of back-end writes to the storage devices 150 and 140 with the fast storage devices 150. Secondly, the data can be written through to the fast storage device 150 in addition to being stored in the cache before the write is considered complete. This increases the redundancy of the data by storing it in two places.

Also, by using the fast storage devices 150 to store the parity units, data reconstruction times for data contained on a failed disk are improved. Therefore, online reconstruction of the contents of a failed disk may take less time to complete, or have a smaller impact on the performance degradation observed by applications accessing the data in parallel with online reconstruction, or both.

It will be apparent to one of ordinary skill in the art that the controller 160 may be a component separate from the disks 140 and the fast storage devices 150. Furthermore, the controller 160 may be implemented with software components, instead of hardware components, or both software and hardware components. Also, the computer system 100 is not limited to using a network (e.g., the network 100) for connecting to the clients 120, and one or more clients 120 may be directly connected to the storage device 110. Also, it will be apparent to one of ordinary skill in the art that the storage device 110 may include any type of persistent storage devices. The storage device 110 is not limited to the magnetic hard disks 140 and may include other types of inexpensive storage devices (e.g., optical disks, tapes, etc.). In addition, the fast storage device 150 is not limited to MEMS and may include other fast storage devices, such as flash RAM, magneto-resistive RAM (MRAM), battery-backed DRAM or SRAM, etc. Also, the disk arrays and fast storage arrays may not be in one box or even in one location, and the disks 140, the fast storage devices 150 and the controller 160 may be connected via one or more networks.

Figure 6:
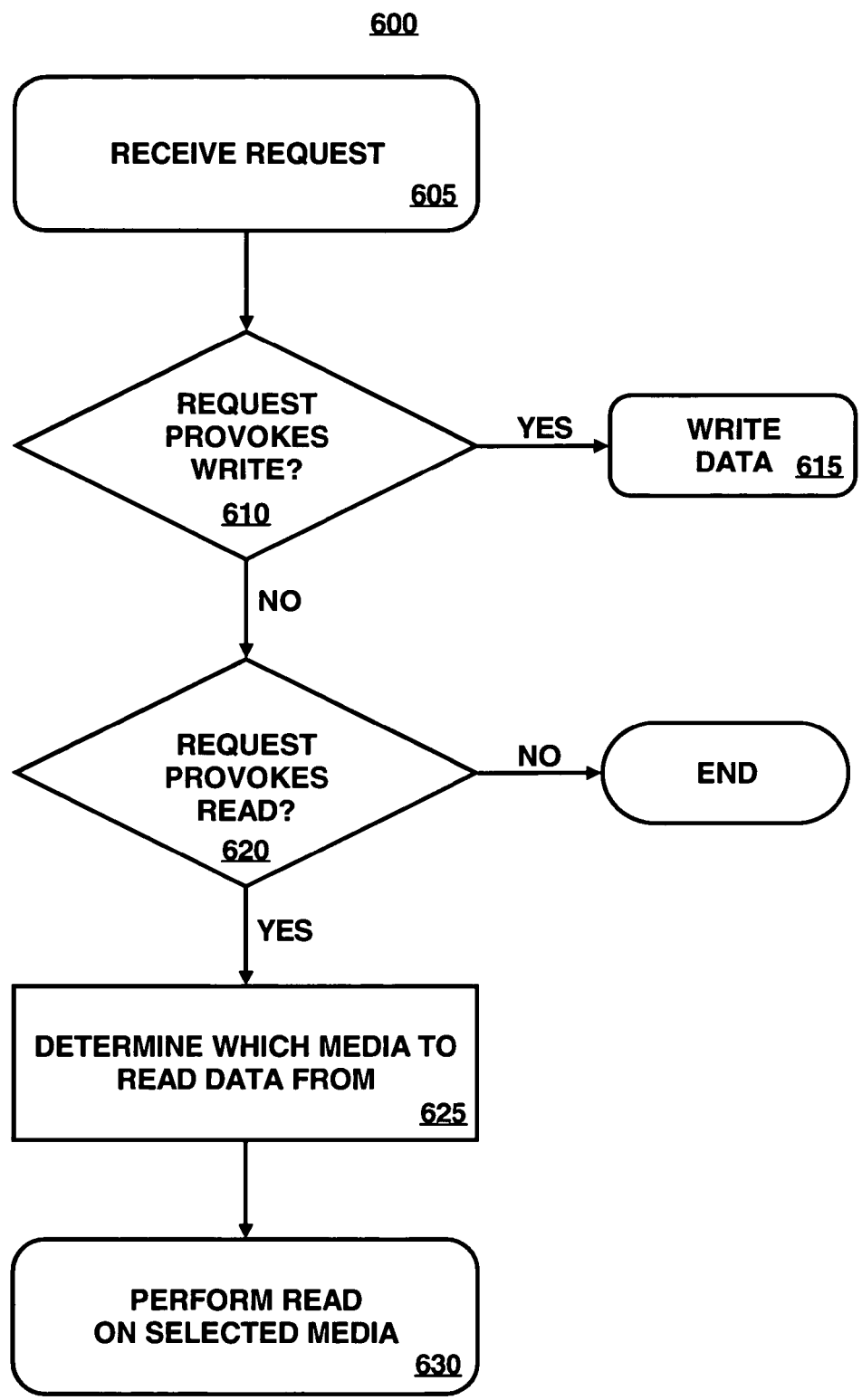
FIG. 6 illustrates a flow diagram of an exemplary method, according to an embodiment of the invention.

FIG. 6 illustrates a flow diagram of a method 600 for operating the controller 160, according to an embodiment of the invention. The method 600 is described with respect to the computer system 100 shown in FIG. 1, but may be applied to other systems. Furthermore, the method 600 describes one embodiment of implementing read and write accesses on the storage device 110, assuming no failures have occurred in either the pool of disks 140 or the pool of fast storage devices 150. Cases with failed components that have not yet been fully repaired can be handled by standard variations on the method 600, that are apparent to one of ordinary skill in the art.

In step 605, the controller 160 receives a request to perform a data operation from one of the clients 120.

In step 610, the controller 160 determines whether the request provokes a write operation on the storage device 110. A write operation, for example, may be provoked by a write request from a client 120 or by a request from the controller 160 (e.g., if modified blocks must be flushed from the cache 145 back to stable storage). If the request provokes a write operation, the controller writes data to the disks 140 and the fast storage devices 150 (step 615). Data includes, for example, data written to the disks 140 and redundant data (e.g., parity information or a copy of the data written to the disks 140) written to the fast storage devices 150.

In step 620, if a write operation is not provoked, the controller 160 determines whether a read operation is provoked. Read operations may be provoked by requests from a client 120 (e.g., read requests) and/or the controller 160 (e.g., by read-ahead operations). In step 625, if a read operation is provoked, the controller 160 determines whether to read the requested information from the disks 140 or the fast storage devices 150. For example, if the data is stored on the disks 140 and parity information is stored on the fast storage devices 150, the controller 160 reads the data from the disks 140. If data is stored on both the disks 140 and the fast storage devices 150, the controller 160 may base the decision on a variety of factors, such as one or more of an amount of pre-existing load and a proximity between a previous device I/O access (e.g., a read, write, or a seek) and a new I/O access associated with the request. For example, the controller 160 may direct the read to the device with the shortest outstanding request queue; or it may select the device with the shortest estimated positioning time; or it may read from both devices, and discard or cancel the second request to complete. In step 630, the controller reads the requested information from the selected storage device.

The method 600 is an exemplary embodiment of a method for performing data operations in a computer system using fast storage devices, such as the computer system 100. It will be apparent to one of ordinary skill in the art that the method 600 is subject to many alternatives, modifications and variations without departing from the spirit and scope of the invention. For example, some of the steps in the method 600 may be performed in different orders. Step 625 may be performed before step 610, because the controller 160 may determine in any order what type of data operation needs to be performed to respond to a request from one of the clients 120.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method of performing data operations in a storage system comprising steps of:
   receiving a request to perform a data operation to a logical unit (LU), at least one first storage device and at least one fast storage device forming the LU, and the at least one first storage device and at least one fast storage device being a redundancy group for data and all corresponding redundant data, and the at least one fast storage device being other than one or more disk drives;
   determining whether the request provokes a write operation; and
   writing data for the operation to the at least one first storage device and writing redundant data for the operation to the at least one fast storage device in response to the request provoking a write operation wherein the write operation is not complete until the data and the redundant data for the operation are stored in the LU.

2. The method of claim 1, further comprising steps of:
   determining whether a request provokes a read operation; and
   reading data from one of the at least one first storage device and the at least one fast storage device in response to the request provoking a read operation.

3. The method of claim 2, wherein the step of reading data comprises selecting one of the at least one first storage device and the at least one fast storage device for performing the read operation based on one or more of an amount of pre-existing load on the at least one first storage device and the at least one fast storage device, and a proximity between a previous I/O access and a new I/O access associated with the request.

4. The method of claim 1, wherein the step of writing redundant data further comprises writing a copy of the data written to the at least one first storage device to the at least one fast storage device.

5. The method of claim 1, wherein the step of writing redundant data further comprises writing parity data associated with the data written to the at least one first storage device to the at least one fast storage device.

6. The method of claim 1, wherein the at least one first storage device includes a disk array.

7. The method of claim 6, wherein the at least one fast storage device includes one or more fast storage devices, wherein a positioning time for one of the fast storage devices is shorter than a positioning time for a disk in the disk array.

8. The method of claim 7, wherein the fast storage devices include one or more of a RAM, a flash RAM, MEMS-based storage device, magneto-resistive RAM, DRAM and SRAM.

9. The method of claim 1, wherein the system further comprises at least one cache for caching data.

10. The method of claim 1, wherein the at least one first storage device comprises one or more of magnetic disks, optical disks, and tapes.

11. A method of performing data operations in a storage system comprising steps of:
    receiving a request to perform a data operation to a logical unit (LU), at least one first storage device and at least one fast storage device forming the LU, and the at least one first storage device and at least one fast storage device being a redundancy group for data and all corresponding redundant data, and at least one of the fast storage devices having a capacity that is smaller than at least one of the first storage devices;
    determining whether the request provokes a write operation; and
    writing data for the operation to the at least one first storage device and writing redundant data for the operation to the at least one fast storage device in response to the request provoking a write operation wherein the write operation is not complete until the data and the redundant data for the operation are stored in the LU.

12. The method of claim 11, further comprising:
    determining whether a request provokes a read operation; and
    reading data from one of the at least one first storage device and the at least one fast storage device in response to the request provoking a read operation.

13. The method of claim 12, wherein the stepp of reading data further comprises selecting one of the at least one first storage device and the at least one fast storage device for performing the read operation based on one or more of an amount of pre-existing load on the at least one first storage device and the at least one fast storage device, and a proximity between a previous I/O access and a new I/O access associated with the request.

14. The method of claim 11, wherein the step of writing redundant data further comprises writing a copy of the data written to the at least one first storage device to the at least one fast storage device.

15. The method of claim 11, wherein the step of writing redundant data further comprises writing parity data associated with the data written to the at least one first storage device to the at least one fast storage device.

16. The method of claim 11, wherein the at least one first storage device comprises one or more of magnetic disks, optical disks, and tapes.

17. A storage system comprising:
a controller configured to perform data operations, including a write operation;
at least one first storage device storing data; and
at least one fast storage device storing data redundant to the data stored in the at least one first storage device, the at least one fast storage device being other than one or more disk drives, and the at least one first storage device and the at least one fast storage device forming a logical unit (LU) redundancy group for the data and all the corresponding redundant data wherein the write operation is not complete until data and redundant data for the write operation are stored in the LU.

18. The storage system of claim 17, wherein the at least one first storage device comprises one or more of magnetic disks, optical disks, and tapes.

* * * * *

UNITED STATES PATENT AND TRADEMARK OFFICE
CERTIFICATE OF CORRECTION

| | | |
|---|---|---|
| PATENT NO. | : 7,979,632 B2 | Page 1 of 1 |
| APPLICATION NO. | : 10/235924 | |
| DATED | : July 12, 2011 | |
| INVENTOR(S) | : Guillermo Alvarez et al. | |

It is certified that error appears in the above-identified patent and that said Letters Patent is hereby corrected as shown below:

In column 8, line 49, in Claim 13, delete "stepp" and insert -- step --, therefor.

Signed and Sealed this
Sixth Day of December, 2011

David J. Kappos
*Director of the United States Patent and Trademark Office*